3,202,728
GLUE COMPRISING HYDROXYL CONTAINING POLYESTER, POLYISOCYANATE AND RESORCINOL
Samuel Kohn, Paris, France, assignor to Office National d'Etudes et de Recherches Aerospatiales, Chatillon-sous-Bagneux, France, a corporation of France
No Drawing. Filed Apr. 21, 1960, Ser. No. 23,602
Claims priority, application France, Apr. 24, 1959, 793,077
22 Claims. (Cl. 260—853)

This invention relates to polyurethane glues.

Polyurethane glues are already known; they are generally obtained by causing one or more polyesters to react with one or more polyisocyanates, mostly di-isocyanates.

It is first object of this invention to provide a polyurethane glue of this character which is easy to manufacture and adapted to utilize, as component elements, substances currently available in the market.

It is another object of the present invention to provide a glue of the type set forth which is easy to apply and has relatively long useful or "pot-life" so that, after its preparation from its constituents at the time of its actual use, as conventional in the practice of polyurethane glues, it may be handled and used without difficulty under ordinary workshop conditions, and that it may thus be employed for many industrial applications, notably in mass-production processes.

Furthermore, it is an object of this invention to provide a glue which, after its application, forms glued joints having properties superior, from many points of view, to those of joints obtained with other known glues.

In this respect, it is another object of this invention to provide a satisfactory glue for application in the cold state, that is, a glue giving satisfactory results without necessitating any heat treatment.

Moreover, it is an object of this invention to provide a glue adapted to form glued joints having a particularly good resistance to the action of heat and also to boiling water.

More generally, it is a further object of this invention to provide a glue characterized by the advantages resulting from the absence of any solvent.

The glue according to this invention, which is of the polyurethane type, is remarkable in that it contains a phenolic compound; in this respect, remarkable results have been obtained with resorcinol or similar substances.

Resorcinol has already been used in the manufacture of glues, notably as the chief component of so-called phenolic glues, but these glues pertain to a type differing completely from that of polyurethane glues, have definitely different properties and different fields of application. In phenolic glues resorcinol is effective in a polycondensation reaction with formol under the influence of alkaline or acid catalysts.

By using resorcinol as a component added to a polyurethane glue it is possible to obtain a glued joint having improved properties which, in the applicant's opinion, are to be ascribed to the fact that, at the same time, the presence of resorcinol increases the adhesiveness of the glue while preserving a good mechanical strength of the glue joint with respect to the various types of stress likely to be applied thereto.

Moreover, it has been found that it was possible to adapt the quantity of resorcinol to be added as a function of the main component elements of the glue, and notably of the polyester, that is, of the nature and/or quantity of the substances from which this polyester is prepared.

The invention also contemplates the addition of resorcinol to the polyester resin without causing any reaction to take place at this stage, as the resorcinol will simply dissolve in the polyester if the temperature is high enough. It is the hardener added during a later stage of the process, that is, the di-isocyanate, which, by taking the hydroxyls carried both by the polyester and by the resorcinol, causes the later to be incorporated into the common molecular structure to yield a high-quality glue.

The nature and quantity of the resin components, and the quantity of resorcinol added thereto, are so selected that the glue joint, while having a rigidity sufficient to impart a good mechanical strength thereto, will nevertheless withstand shearing stresses so that the final joint has the optimum cohesion resulting from the compromise between the rigidity and plasticity properties, while displaying an adhesiveness relatively high and superior to that of known polyurethane glues with respect to the parts glued therewith, this satisfactory result being due to the presence of resorcinol.

The resorcinol is advantageously added in a proportion ranging from .1% and 10.0% by weight of the polyester and preferably from .5% to 2.5%.

A remarkable feature of the glue according to this invention lies in the fact that a single di-isocyanate, such as toluylene-di-isocyanate, which is a product easily available on the market, may be used as a hardener, and that it is not necessary to use other di-isocyanates which are sometimes difficult to get.

*Preparation of the polyester*

Initial materials are a triol, a glycol and one or more di-acids. The proportions of the polyester component are as follows.

For 1 mol of triol:
 from .2 to .5 mol of glycol, and
 .8 to 1.5 mols of diacids,
it being understood that these limits are not critical.

Amongst the triols suitable for carrying out the invention, glycerin, 1,2,4 butanol-triol, trimethylol-propane, 1,2,5 pentane-triol, 1,3,5 pentane-triol may be used.

Examples of diols suitable for the purposes of this invention are the aliphatic diols such as ethylene-, diethylene-, triethylene-, tetraethylene- or other polyethylene-glycol; 1,2 propane-diol; 1,2 butane-diol; 1,3 butane-diol, 1,4 butane-diol, 2,3 butane-diol. Alicyclic diols are also suitable for carrying out the invention.

The diacids, whether used separately or in admixture, may consist of aliphatic acids such as oxalic acid, malonic acid, succinic acid, glutaric acid, adipic acid, azelaic acid or the alicyclic diacids, or the aromatic diacids such as the terephthalic acid, the phthalic acid, the isophthalic acid.

*Example A*

The polyester having the following composition is prepared:

| | Mols |
|---|---|
| Trimethylol-propane | 96 |
| Triethylene-glycol | 36 |
| Sebacic acid | 50 |
| Phthalic anhydride | 50 |

A typical mode of operation is as follows: the components, in the above proportions, are mixed in a glass balloon flask or in a stainless steel container and the mass is gradually heated to 180° C. to prevent any one of the components from being carried away. The reaction starts rapidly at about 160° C. When one-half of the reaction has been effected, which occurs very rapidly and is ascertained by the elimination of one-half of the water that can theoretically be eliminated, a stream of oxygen-free nitrogen is bubbled through the liquid so that the medium is properly stirred and the water properly carried along. Advantageously, the medium may simultaneously be subjected to mechanical stirring.

After a few hours at 180° C., the temperature is raised to 200° C. and the reaction continued until an acid number approximating 0 or at least inferior to 1 is obtained (the acid number consisting in this case of the number of milligrams of caustic potash necessary for neutralizing one gram of polycondensate and characterizing in a sufficient manner the polyester prepared from predetermined components and in predetermined proportions). At the end of the reaction, the polyester is maintained at 180°–200° C. under a 15-mm. Hg vacuum during a time period ranging from 15 minutes to several hours according to the mass of the product and its temperature. Thus, the obtaining of a neutral polyester is facilitated. It is not desirable to extend the duration of this heating step in vacuo, for it might be attended by an incipient reticulation.

INTRODUCTION OF RESORCINOL

To the polyester obtained in the manner set forth hereinabove, 1.25% by weight of resorcinol are added. This addition is accomplished at a temperature ranging from the melting point (110° C.) and the boiling point (280° C.) of this substance, that is, preferably at about 150° C.

During this introduction the usual cares are taken to avoid the presence of water as this would contaminate the di-phenol and, more particularly, the resorcinol is added to a water-free polyester.

PREPARATION OF THE GLUE

The glue is prepared before use by mixing the polyester to which the resorcinol has been added with toluylene di-isocyanate. The quantity of this last component will advantageously range from 45 g. to 60 g. per 100 g. of the polyester and resorcinol mixture.

Example B 41.5 cc. (50.6 g.) of toluylene di-isocyanate are added slowly and at room temperature to 100 g. of the polyester and resorcinol mixture prepared according to Example A.

After complete dissolution of the polyester in the di-isocyanate, the mixture is so cooled as to keep its temperature close to 18°–20° C. throughout the duration of its application.

The glue thus obtained has a useful preservation or "pot" life of about 45 minutes at room temperature for quantities inferior to 50 g. In the case of larger quantities the pot-life is of the same order, provided that the temperature is properly checked to maintain it, if necessary, below 20° C. by means of a proper cooling.

CONDITIONS OF APPLICATION OF THE GLUE

Preferably, the glue is applied in a well-ventilated room at a temperature of about 20° C., the hygrometric degree being about 50%.

After preparing the glue in the manner set forth hereinabove, a few minutes are allowed to elapse prior to its actual application. The glue is applied in the form of a thin layer on the surface to be glued, for example by means of a rubber or polyethylene doctor blade.

EXAMPLE 1

The coated faces of the parts to be glued are pressed against each other by a contact pressure of the order of 14 p.s.i. and held in position at room temperature during about 24 hours. After this time period the glued joint is very good. Its strength continues to improve thereafter during a few days, even in the absence of an application pressure.

EXAMPLE 2

The same procedure as in Example 1 hereinabove is adhered to, but the contact pressure is reduced to about 11.5 p.s.i.

EXAMPLE 3

The coated parts, after having been held in contact during 24 hours at room temperature as set forth in Example 1 hereinabove, are then heated at 70° C. during at least 4 to 5 hours.

EXAMPLE 4

The coated parts, after having been kept in contact during 24 hours at room temperature as set forth in Example 1 hereinabove, are then heated at a temperature from 100° C. to 120° C. during at least 1 or 2 hours.

EXAMPLE 5

Sheet metal consisting of 1.6-mm. thick duralumin stock cut in the form of rectangular plates of 40 mm. by 130 mm. is used. These plates are scoured by means of a sulfo-chromic treatment and coated with a glue according to this invention which is obtained according to the Example B hereinabove on a 10-mm. long strip. Then the coated areas (400 sq. mm.) of these plates are pressed against each other by a pressure of 11.5 p.s.i. This pressure is maintained during 24 hours at room temperature. Then the parts are heated during 2 hours at 125° C.

EXAMPLE 6

The same procedure as in Example 5 is adhered to, but after maintaining the plates during 24 hours at room temperature they are heated at 60° C. during 4 hours.

EXAMPLE 7

The same sequence of steps as in Example 5 is observed, but instead of maintaining the plates pressed against each other at room temperature during 24 hours, they are kept during 72 hours without subsequently heating them.

MECHANICAL PROPERTIES OF THE GLUED JOINTS

(a) Shearing strength at room temperature

This strength is determined from an assembly of two superposed plates glued as in Example 5 hereinabove. A tractive effort is exerted on the outer ends of the plates and the values indicated hereinafter are those obtained by dividing the value of the tractive force (in kilograms) when the rupture takes place, by the coated area, that is, 400 sq. mm.

The figures given hereinafter for the samples obtained according to Example 5, Example 6 and Example 7, respectively, relate successively to tests accomplished on samples as stripped from the molds, to tests accomplished on the same samples but after having submitted them during 8 hours to a heat treatment in boiling water and, finally, to samples which have been immersed—without extracting them from the molds—during 28 days in water at 20° C.

|  | Kg./sq. mm. | | |
|---|---|---|---|
| Sample 5 | 2.75 | 2.12 | 2.17 |
| Sample 6 | 2.45 | 2.13 | |
| Sample 7 | 2.04 | 1.92 | 2.2 |

(b) Shearing strength in the heated state

Samples obtained according to Example 5 hereinabove are subjected to traction tests until the rupture takes place, at various temperatures indicated in the first line of the underlying table, the shearing resistance in kg./sq. mm. being shown respectively in the second line.

| ° C. | 20 | 75 | 100 | 120 | 140 | 200 |
|---|---|---|---|---|---|---|
| Kg./sq. mm | 2.9 | 2.5 | 1.5 | 1.4 | 0.9 | 0.2 |

(c) Resistance to torsional shearing stresses

Samples according to Example 5 hereinabove are prepared, but the metal stock consists in this case of (duralumin) tubes of 15 mm. I.D. and 18 mm. O.D., glued end to end.

After being maintained during 24 hours at room temperature these samples have been heated during 2 hours at 125° C. and subjected to torsion tests after cooling. The torsional shearing strength thus ascertained is in the average 6.2 kg./sq. mm.

(d) Creep test

The procedure of tests (a) and (c) hereinabove is applied, but the plates, instead of being subjected to a tractive force of increasing value, support a constant load of 250 g./sq. mm. and are subjected to a temperature increasing by steps, each step representing 20° C. and being followed by a 20-minute temperature level.

With the samples obtained according to Example 5, the breaking temperature was 120° C. With the samples obtained in Example 7 it was only 47° C.

(e) Ageing test (i) The same procedure as in test (a) is adhered to, but the samples treated in this test are those which, after having been stripped from the mold, have been aged at 80° C. (dry heat) during 500 hours. The shearing strength value after this ageing period was found to be 2.7 kg./sq. mm.

(ii) Same procedure as in the preceding test, but with samples having been subjected to a 80° C. dry heat treatment during 1,000 hours. The shearing strength was found to be 2.5 kg./sq. mm.

Although it is the addition of resorcinol that has given the best results, it would not constitute a departure from this invention to add to a polyurethane glue another polyphenol such as catechol, hydroquinone, phloroglucinol, or the hydroxy-phenol polyphenols obtained by the condensation of phenols with formol, as the para-methylol-phenol, saligenin and their condensation products.

Example C

The basic resin utilized in this example has the following composition:

|  | Percent by weight |
|---|---|
| Polyester of Example A | 98.75 |
| Hydroquinone | 1.25 |

To this resin a hardener for forming the glue, that is, toluylene di-isocyanate, is added in the proportion of 50.6% of the initial resin.

The shearing strength of single-coated glued parts as per above is determined. The next table shows the results of these tests, the hardening having taken place at room temperature:

| Hardening period, days | 4 | 11 | 28 |
|---|---|---|---|
| Shearing strength, kg./sq. mm | 1.5 | 1.7 | 2.0 |

Other parts glued in the same manner are treated with a view to determine the shearing strength firstly after hardening during 24 hours at room temperature and then during two hours at 120° C. The value obtained was 2.4 kg./sq. mm.

Similar parts subjected beforehand to the same hardening treatment, that is, 24 hours at room temperature and 2 hours at 120° C, have subsequently been immersed during 8 hours in boiling water. Their shearing strength was still 2.2 kg./sq. mm.

Example D

A glue having the following composition.

Initial resin:
    Polyester of Example A _____ 97.5% by weight
    Hydroquinone _____ 2.5% by weight
Hardener: Toluylene di-isocyanate ___ 51.9% by weight
    of the initial resin.

The parts glued with this glue have been subjected to the same tests as hereinabove.

After hardening during 24 hours at room temperature, and heating during 2 hours at 120° C., a shearing strength of 2.8 kg./sq. mm. was found.

After hardening during 24 hours at room temperature and heating during 2 hours at 120° C., the parts were immersed during 8 hours in boiling water; their shearing resistance was still 2.1 kg./sq. mm.

Example E

The initial resin utilized has the following composition:

|  | Percent |
|---|---|
| Polyester of Example A | 97.5 |
| Ammoniacal resol | 2.5 |

The ammoniacal resol was prepared by condensing 1 mol of phenol with 1.25 mols of aqueous formol in the presence of .033 mol of ammonia. This resol was dehydrated in vacuum down to $$\eta_D^{25} = 1.596$$

The hardener utilized is the toluylene di-isocyanate added in the proportion of 48.8% of the initial resin. The shearing strength of the glue part, which was determined during tests carried out under the same conditions as in the preceding example, where 2.6 kg./sq. mm. and 1.8 kg./sq. mm. respectively.

Example F

The glue has the same composition as in Example E hereinabove, but before introducing the di-isocyanate the initial resin has been carefully dehydrated by heating at 30° C. under a 0.1-mm. Hg vacuum during several hours.

The values of the shearing strength, under the same conditions as those set forth in Example E, are 2.9 kg./sq. mm. and 2.3 kg./sq. mm. respectively.

What I claim is:

1. A substantially water-free glue comprising a mixture of a polyisocyanate, resorcinol, and a polyester having free hydroxyl groups, said glue producing a polyurethane when cured.

2. A glue according to claim 1, wherein said resorcinol is present in an amount between from about 0.1 percent to about 10 percent by weight of the polyester.

3. A glue according to claim 2, wherein the resorcinol is dissolved in the polyester.

4. A glue according to claim 3, wherein said polyester is a dehydrated polyester derived from the reaction of a triol, a glycol, and at least one diacid, the amount of the glycol being from about 0.2 to about 0.5 mol per mol of triol and the amount of diacid being from about 0.8 to about 1.5 mols per mol of triol.

5. A glue according to claim 4, wherein the resorcinol is present in an amount between about 0.5 to about 2.5 percent by weight of the polyester.

6. A glue according to claim 5, wherein the polyester is substantially neutral.

7. A glue according to claim 6, wherein the polyisocyanate is toluylene-di-isocyanate, and the polyester is a dehydrated polyester obtained by reacting about 96 mols of trimethylol-propane, 36 mols of triethylene-glycol, 50 mols of sebacic acid, and 50 mols of phthalic anhydride until an acid number lower than 1 is obtained, said toluylene di-isocyanate being present in an amount from about 45 to 60 parts by weight per hundred parts of the mixture of polyester and resorcinol.

8. A method of adhering two surfaces comprising the steps of interposing between said surfaces the glue of claim 1 and curing said glue.

9. The product of claim 8.

10. A method of adhering two surfaces comprising the steps of interposing between said surfaces the glue of claim 2, and curing said glue.

11. The product of claim 10.

12. A method of adhering two surfaces comprising the steps of interposing between said surfaces the glue of claim 5 and curing said glue.

13. The product of claim 12.

14. A method of adhering two surfaces comprising the steps of interposing between said surfaces the glue of claim 7 and curing said glue.

15. The product of claim 14.

16. A method of preparing a substantially water-free glue comprising the steps of dissolving resorcinol, in the absence of water, in a dehydrated polyester having free hydroxyl groups, and then adding a polyisocyanate to said solution, in the absence of water.

17. A method according to claim 16, wherein said resorcinol is present in an amount from about 0.1 percent to about 10 percent by weight of the polyester.

18. A method according to claim 17, wherein the resorcinol is added to the polyester at a temperature ranging from about 110° to about 280° C.

19. A method according to claim 18, wherein said polyisocyanate is toluylene di-isocyanate, and the polyester is a dehydrated polyester obtained by reacting about 96 mols of trimethylol-propane, 36 mols of triethyleneglycol, 50 mols sebacic acid, and 50 mols of phthalic anhydride until an acid number lower than 1 is obtained, said resorcinol being present in an amount from between about 0.5 to 2.5 percent by weight of the polyester and the toluylene di-isocyanate being present in an amount from about 45 to 60 parts by weight per 100 parts of the solution of polyester and resorcinol.

20. A method of manufacturing a glue comprising admixing resorcinol, in the absence of water, with a dehydrated polyester prepared by reacting a triol, a glycol and at least one diacid, the amount of glycol being from between 0.2 to 0.5 mol per mol of triol and the amount of diacid being from 0.8 to 1.5 mols per mol of triol, said polyester having an acid number less than one, said resorcinol being admixed in an amount from between 0.5 to 2.5 percent by weight of said polyester, adding toluylene, in the absence of water to the mixture of polyester and resorcinol in an amount between 45 to 60 parts per weight of di-isocyanate per 100 parts of the mixutre of polyester and resorcinol.

21. A method of adhering two surfaces comprising producing a glue by admixing resorcinol, in the absence of water with a dehydrated polyester prepared by reacting a triol, a glycol and at least one diacid, the amount of glycol being from between 0.2 to 0.5 mol per mol of triol and the amount of diacid being from 0.8 to 1.5 mols per mol of triol, said polyester having an acid number less than one, said resorcinol being admixed in an amount from between 0.5 to 2.5 percent by weight of said polyester, adding toluylene di-isocyanate, in the absence of water, to the mixture of polyester and resorcinol in an amount between 45 to 60 parts per weight of di-isocyanate per 100 parts of the mixture of polyester and resorcinol, interposing said glue between surfaces to be united and curing the glue.

22. The product produced by the method of claim 21.

References Cited by the Examiner

UNITED STATES PATENTS

| | | | |
|---|---|---|---|
| 2,432,148 | 12/47 | Furness et al. | 260—841 |
| 2,602,783 | 7/52 | Simon et al. | 260—2.5 |
| 2,625,532 | 1/53 | Seeger | 260—77.5 |
| 2,806,836 | 9/57 | Nischk et al. | 260—859 |
| 2,878,201 | 3/59 | Beindorff | 260—33.4 |
| 2,916,472 | 12/59 | Nischk et al. | 260—75 |
| 2,935,487 | 5/60 | Fox et al. | 260—33.4 |
| 2,941,967 | 6/60 | Moller et al. | 260—2.5 |
| 2,981,710 | 4/61 | Hoenal | 260—29.3 |
| 2,990,385 | 6/61 | Schmutzler | 260—844 |

FOREIGN PATENTS

| | | |
|---|---|---|
| 164,533 | 8/55 | Australia. |
| 1,042,889 | 11/58 | Germany. |

OTHER REFERENCES

Rubber Age, volume 77, No. 1, April 1955, pages 63–68.

MURRAY TILLMAN, *Primary Examiner.*

DANIEL ARNOLD, LEON J. BERCOVITZ,
*Examiners.*